(No Model.)
E. R. WHITNEY.
APPARATUS FOR HEATING WATER BY ELECTRICITY.
No. 244,704. Patented July 19, 1881.
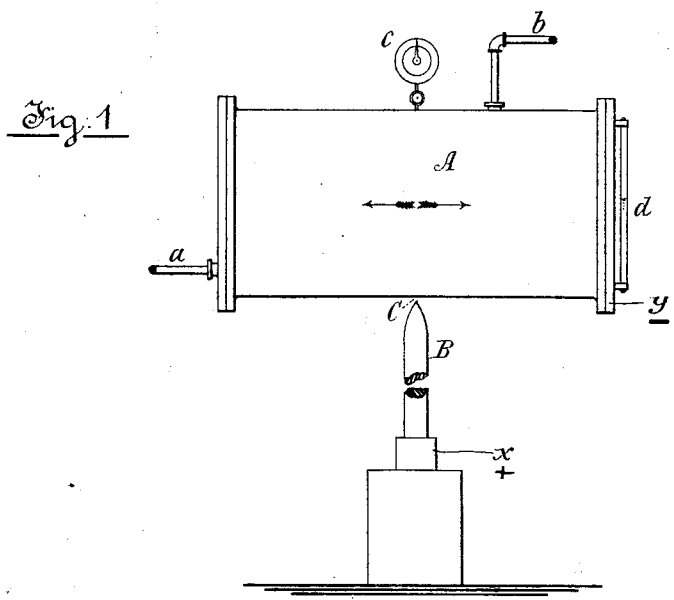
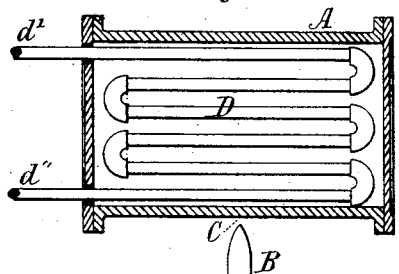
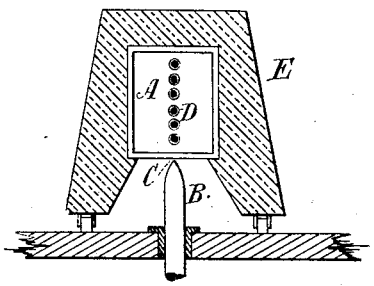
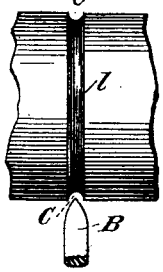
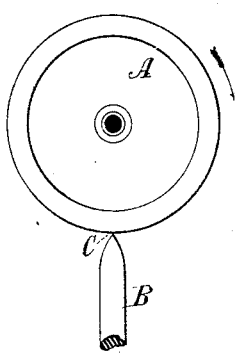
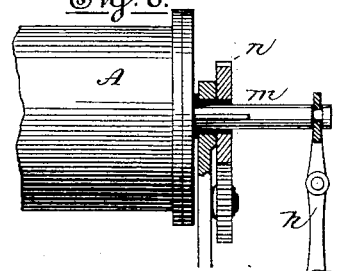
Witnesses:
L. D. Varey.
Owen N. Evans.
Inventor.
Edwin Ruthven Whitney,
Per R. Arthur Sellond,
Atty.

UNITED STATES PATENT OFFICE.

EDWIN R. WHITNEY, OF MONTREAL, QUEBEC, CANADA, ASSIGNOR OF TWO-THIRDS TO CHARLES L. BOSSÉ AND J. A. I. CRAIG, BOTH OF SAME PLACE.

APPARATUS FOR HEATING WATER BY ELECTRICITY.

SPECIFICATION forming part of Letters Patent No. 244,704, dated July 19, 1881.

Application filed June 13, 1881. (No model.)

*To all whom it may concern:*

Be it known that I, EDWIN RUTHVEN WHITNEY, of the city of Montreal, in the district of Montreal and Province of Quebec, Canada, have invented a new and useful Method and Apparatus for Generating Steam and Heat from Water by Electricity; and I do hereby declare that the following is a full, clear, and exact description of the same.

In the accompanying drawings, Figure 1 represents a side elevation of my invention; Fig. 2, a longitudinal section, showing modification of water-pipe. Fig. 3 shows, in transverse section, a covering of heat-retaining material for the water-heating chamber. Fig. 4 shows an end elevation of a cylindrical form of the water-chamber. Figs. 5 and 6 show means for more safely and conveniently applying the heat.

The object of my invention is to provide convenient and efficient means for heating water or raising steam for warming buildings, cooking purposes, or for motive power, or for any of the purposes for which heated water or steam may be applied.

Heretofore various devices have been suggested for utilizing the heat produced by an electric current for heating water. Among these is the plan of locating the electrodes within the water. It has also been suggested to connect the wires leading to opposite poles within the water by a platinum wire or to locate the electrodes above the surface of the water within the vessel containing the same.

There are obvious objections to these modes, not necessary to discuss. I have sought to overcome these, and have devised an effective apparatus for the purpose by constituting the chamber in which the water is to be heated one of the electrodes, and arranging in opposition and suitable proximity thereto another electrode in the electric circuit, whereby the heat generated by the passage of the electric current is applied to raising the temperature of the water. In this my invention principally consists.

It also consists of details of construction, all hereinafter fully set forth and particularly claimed.

In carrying out my invention I construct the negative pole in the form of a metallic cylinder or chamber, A, (referring particularly to Fig. 1,) into which the water to be heated is placed, and this cylinder is supported in any suitable manner close to a carbon point, B, connected to the positive pole of the generator, and in this manner forming the voltaic arc at the point C. Directly the current reaches the point of the positive carbon B and comes in contact with the air it ignites said carbon and then passes on to the chamber A, which is constructed of metal or substance of a conductive nature, and then goes to earth or back to the dynamo-machine, the electric flame at the point of junction, however, serving to highly heat the substance of the chamber A, which, in turn, communicates said heat to its contents, and thus generates steam.

In order to prevent fusion or burning through of the metal at the point where the electric flame or current strikes the chamber A, I arrange said chamber in such a manner as will permit of its being moved back and forth, or in any way which will insure the distribution of the heat over a larger portion of its surface. The water-chamber is represented as so mounted in Fig. 3, the chamber being shown as provided with small wheels. Also, in Fig. 6, I have shown at $h$ a vibrating arm, $h$, which may be moved by any convenient means for giving longitudinally-reciprocating motion to the chamber. Other means may be used as well.

$a$ is the supply-pipe, $b$ the exhaust, and $c$ and $d$ represent any suitable gages.

In Fig. 2 D represents a coil of pipes placed inside the chamber A, and provided with a supply-branch, $d''$, and a discharge-branch, $d'$, into which coil water or air may be introduced, and after passing through said coil may be again discharged or delivered in a heated condition to any system of warming-pipes or cooking apparatus throughout a building.

In some cases it may be found desirable to inclose the chamber A (as shown in Fig. 3) within a coating or jacket, E, of soapstone, asbestus, or other substance, which will be non-conducting and non-radiating.

Another modification of my invention is shown in Fig. 4, where the chamber A is made in the form of a cylinder, which may be revolved near the positive carbon B at any speed found necessary, and if desired may have a groove or pathway formed on its surface, into which the carbon point may fit, or, when desirable, and to lessen the danger of the metal becoming fused or burned through, a longitudinal motion may, in addition to that just described, be given to the chamber by any appropriate means. This is shown in Fig. 5, in which the groove is represented at $l$. A like cylinder is shown in Fig. 6, provided with an oscillating lever, $h$, which acts, in connection with a shaft, $m$, of the cylindrical chamber, to give longitudinal motion. Means for rotating are also shown at $n$, consisting of a pinion loosely connected to the shaft by a spline, to permit longitudinal motion while the pinion turns the shaft at any convenient speed. These means give both longitudinal and rotary motion, but one of these may be sufficient.

Although I have herein described only four modifications of apparatus to be used in carrying my invention into effect, I wish it to be understood that I do not confine myself to these particular ways of working, as many other variations may be made without departing from the main points of my invention, such as keeping the chamber A always stationary and arranging the positive carbon B to move to and fro or revolve round it, &c.

It will be understood that proper electric connections, as indicated at $x$ and $y$, are to be made, and that the chamber must be properly insulated; and, furthermore, I do not limit myself to the use of carbon for the positive pole, as any other substance found suitable may be used.

Having thus described my invention, what I claim, and desire to secure by Letters Patent, is as follows:

1. An apparatus for heating water by means of electricity, consisting of the chamber for containing the water to be heated, adapted to form one of the electrodes, in combination with a carbon point or other suitable electrode, and line-connections, all as set forth.

2. In an apparatus for utilizing the heat generated by electricity, a chamber to contain water adapted to act as one of the electrodes, and to move reciprocally or by rotation, in combination with a carbon or other point forming the other electrode, substantially as described.

EDWIN RUTHVEN WHITNEY.

Witnesses:
R. ARTHUR KELLOND,
E. C. VAREY.